United States Patent
Ehrenberg, Jr.

[11] 3,771,431
[45] Nov. 13, 1973

[54] BEVERAGE BREWING APPARATUS
[75] Inventor: Milton F. Ehrenberg, Jr., Carpentersville, Ill.
[73] Assignee: Cory Corporation, Chicago, Ill.
[22] Filed: Apr. 6, 1972
[21] Appl. No.: 241,536

[52] U.S. Cl. .................................. 99/295
[51] Int. Cl. ............................. A47j 31/00
[58] Field of Search ............... 99/281, 282, 283, 99/295, 307, 315, 302, 300, 77.1

[56] References Cited
UNITED STATES PATENTS

| | | | |
|---|---|---|---|
| 3,384,004 | 5/1968 | Perlman | 99/295 |
| 3,450,024 | 6/1969 | Martin | 99/295 |
| 3,502,017 | 3/1970 | Alexander | 99/295 |
| 3,511,166 | 5/1970 | Bixby | 99/295 |
| 3,561,349 | 2/1971 | Endo | 99/307 |

Primary Examiner—Robert W. Jenkins
Attorney—Axel A. Hofgren et al.

[57] ABSTRACT

A brewing device, such as a coffee brewer, wherein the hot water is delivered to the brewing chamber through a fixed inlet tube with the charge of beverage ingredients being provided in a bag and held in the brewing chamber suitably to expand against the outer end of the inlet passage means thereby to form a sealed connection permitting the brewing liquid to enter directly through the wall of the bag into the charge material. The beverage is then brewed by the water within the bag and the resultant brew passes outwardly from the bag for delivery to a receiving means such as a decanter. The outlet of the water delivery means is caused to define a flat surface against which the bag is urged as a result of the swelling of the bag caused by the delivery of the hot water thereinto.

12 Claims, 5 Drawing Figures

PATENTED NOV 13 1973
3,771,431
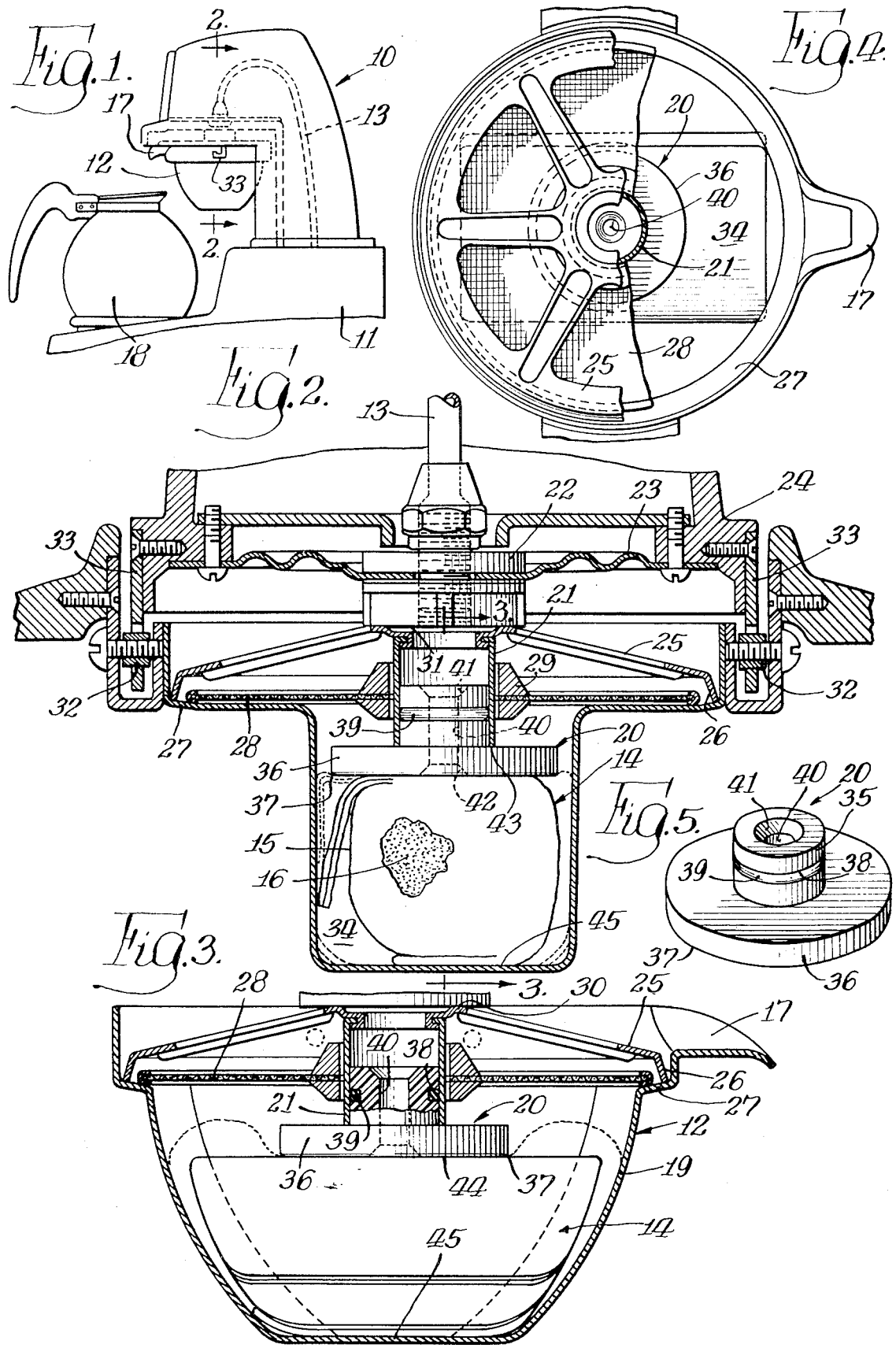

BEVERAGE BREWING APPARATUS

BACKGROUND OF THE INVENTION

1. Field of the Invention

This invention relates to brewing devices and in particular to brewing devices wherein a beverage ingredient is provided within a bag removably installed in the brewing means.

2. Description of the Prior Art

An improved beverage brewing apparatus for use with a bagged charge is shown in Edwin J. Alexander, Jr. et al. U.S. Letters Pat. No. 3,502,017, issued Mar. 24, 1970, and owned by the assignee hereof. In that patent, a brewing apparatus is disclosed wherein the bagged charge is supported in the brewing chamber so as to swell against the end of the hot water delivery tube to provide the above described effectively sealed connection of the delivery tube to the bagged charge during the brewing operation.

The concept of delivering hot water to a bagged charge is also shown in the Perlman et al. U.S. Letters Pat. No. 3,384,004, issued May 21, 1968 for a Coffeemaker. In the Perlman et al. patent, the hot water inlet opens through a wall which extends over an area similar to or greater than the cross-sectional area of the bag engaging the wall in the expanded arrangement thereof. In a more recent U.S. Letters Pat. issued to Sam I. Endo et al. No. 3,561,349, issued Feb. 9, 1971 for a Brewing Means for Prepackaged Coffee, the bagged charge expands into engagement with downwardly projecting ribs concentrically of the outlet end of the hot water delivery tube. Again in the Endo et al. patent, the wall carrying the ribs extends over substantially the entire area of upwardly exposed bag.

SUMMARY OF THE INVENTION

The present invention comprehends an improved beverage brewing apparatus wherein a bagged charge is caused to expand against a hot water delivery means. In the present invention, a force distribution element is provided at the end of the hot water delivery means which has a substantial area for improved distribution of stress forces in the swelling bag thereagainst. The force distribution element preferably has an area substantially less than the total area of the bag arranged to swell upwardly thereagainst so that portions of the bag extend about the lateral edges of the force distribution element in the expanded arrangement thereof. The peripheral edge of the force distribution element is preferably rounded to provide minimum stress in the bag thereat.

The force distribution element may comprise an element removably installed in the end of the tubular inlet passage. More specifically, in the illustrated embodiment, the force distribution element includes a shank portion removably sealingly fitted into the end of the tubular passage, and an outer head portion defining the surface against which the bag swells. The outer head portion may have a cross-sectional area substantially greater than that of the outlet end of the delivery tube and the force distribution element is provided with a through bore for delivering the hot water from the delivery passage therethrough into the bag to effect the desired brewing operation as discussed above.

Means are provided for limiting the insertion of the shank portion of the element into the passage end so as to suitably dispose the surface of the head portion to be engaged by the bag for optimum delivery of the hot water thereinto. The force distribution element is preferably formed of a molded plastic permitting facilitated maintenance thereof in the servicing of the brewing apparatus. The force distribution element further defines means for maintaining the swollen bag surface spaced from an overlying filter screen for improved delivery of the brewed beverage from the bag through the screen to the receiving container. The head portion of the element may be approximately one-half the length of the shank portion and the head portion may have a diameter of approximately half the diameter of the shank portion.

BRIEF DESCRIPTION OF THE DRAWING

Other features and advantages of the invention will be apparent from the following description taken in connection with the accompanying drawing wherein:

FIG. 1 is a fragmentary side elevation of a beverage brewing apparatus embodying the invention;

FIG. 2 is a fragmentary enlarged vertical cross section thereof taken substantially along the line 2—2 of FIG. 1

FIG. 3 is a vertical cross-section taken substantially along the line 3—3 of FIG. 2;

FIG. 4 is a top plan view of the brewing cartridge with portions broken away to facilitate illustration of the invention; and FIG. 5 is a perspective view of the force distribution element thereof.

DESCRIPTION OF THE PREFERRED EMBODIMENT

In the exemplary embodiment of the invention as disclosed in the drawing, a beverage brewing apparatus generally designated 10 is shown to comprise a source 11 of hot water under pressure arranged to provide the hot water to a brewing cartridge 12 through a hot water delivery tube 13. In the illustrated embodiment, the apparatus is adapted to brew coffee and, thus, in illustrating the invention, the description will be directed thereto, it being understood that the invention is adaptable for use in brewing any type of beverage wherein the brewing ingredients are provided in the form of a bagged charge, such as bagged charge 14 shown in FIG. 2. Thus, the bagged charge includes an outer bag 15 holding a suitable quantity of beverage ingredient 16 which, in the illustrated embodiment, comprises ground coffee beans. The brewed beverage may be delivered from the brewing cartridge through an outlet spout 17 thereof to a beverage receiver, such as decanter 18 illustrated in FIG. 1.

As discussed in the assignee's earlier Alexander, Jr. et al. patent, in such an arrangement, the brewing liquid comprising hot water flows into the bag and causes it to expand. The expansion is utilized to provide a seal to the delivery passage means whereupon the hot water is conducted directly into the bag through the area thereof within the sealed portion. The coffee is brewed in the bag and the resultant brewed coffee beverage passes outwardly from the bag to flow through the outlet spout to the desired receiver.

The present invention comprehends the provision of an improved form of such a brewing apparatus wherein the forces generated by the expanding bag are distributed so as to provide an improved sealed engagement of the bag with the brewing liquid delivery means notwithstanding indiscriminate placement of the bagged charge 14 in the bowl 19 of the brewing cartridge 12. In the present invention, the force distribution means generally designated 20 comprises an element removably associated with the discharge end element 21 of the delivery conduit 13. The discharge elemet 21 may comprise an element of the cartridge structure 12, as shown in FIG. 3, and is adapted to receive the hot brewing water from a sealing connector 22 carried on a deflectible diaphragm 23 secured to the housing 24 of the apparatus. The end element 21 is carried on a filter frame 25 provided with a downturned edge flange 26 resting on a peripheral ledge 27 of the bowl 19. A filter screen 28 is carried on the tube 21 by means of a bushing 29 to rest on the ledge 27 inwardly of the flange 26 as shown in FIG. 2. The filter frame defines an uppermost annular ridge 30 which engages the lower end 31 of the sealing connector 22 when the cartridge is installed in the apparatus by means of the roller trunions 32 being received in brackets 33 carried on the housing 24, as shown in FIG. 2. Thus, hot water is delivered from conduit 13 downwardly through connector 22 to flow through end element 21 into the brewing chamber 34 defined by bowl 19.

The bagged charge 14 may be installed in the brewing chamber 34 with the assembled filter frame 25 and filter 28 removed from the upper portion thereof. The filter frame and filter frame assembly are then installed in overlying relationship to the bagged charge, as shown in FIG. 2, with the force distribution element 20 providing an improved connection between the delivery tube portion 21 and the bagged charge 14. More specifically, as shown in FIG. 5, the force distribution element may comprise a mushroom shaped element having a shank portion 35 and an enlarged head portion 36. The head portion includes a peripheral outer edge 37 which is peripherally rounded. Shank portion 35 is provided with an annular recess 38 adapted to receive a sealing ring 39. The element 20 is provided with a through bore 40 having a frustoconical inlet end 41 and a frustoconical outlet end 42. The outer diameter of the shank portion 35 is preselected to provide a slide fit with the end element 21, with the sealing ring 39 effectively sealingly retaining the shank portion in position when the shank portion is inserted into the lower end of tubular element 21, as shown in FIG. 2.

The lower end 43 of the tubular element 21 effectively defines a stop limiting the inward movement of the shank portion 35 and locating the head portion 36 of the force distribution element accurately relative to the bottom wall 45 of the cartridge bowl 19 to provide a desired effective height of the brewing chamber 34 therebetween.

The cross-sectional area of the lower surface 44 of the head portion 36 is preferably substantial to provide a substantial surface of engagement between the swelling bag and the force distribution element while yet the cross-sectional area is made to be substantially less than that of the confronting portion of the bag to permit the bag to expand around the edge 37. Thus, as shown in FIGS. 2 and 3, the cross-sectional area of surface 44 of the force distribution element is substantially less than the corresponding cross-sectional area of the cartridge bowl 19 in the plane of the surface 44 in the assembled arrangement of the cartridge. As best seen in FIG. 4, the cross-sectional area of the head 36 is less than approximately one-half the cross-sectional area of the chamber 34. The force distribution element is preferably formed of a material such as a molded plastic adaptable for facilitated maintenance. As the element 20 may be readily removed and installed in the inlet tube 21, it may be readily cleaned separately from the other elements of the cartridge as desired. In the illustrated embodiment, the bore 40 has a diameter less than approximately one-half the diameter of the end tube 21, the head portion 36 has a thickness approximately one-half the length of the shank portion 35 and the head portion 36 has a diameter of over approximately twice the diameter of the shank portion 35. More specifically, in the illustrated embodiment, the shank portion has a length of approximately one-half inch and the head portion has a thickness of approximately one-fourth inch.

As a result of the use of the improved force distribution element 20, the user of the brewing apparatus may place the bagged charge 14 in the brewing chamber 34 in substantially any position while yet assuring the proper brewing of the coffee in the subsequent brewing operation by assuring a proper sealed connection of the bag as it swells into engagement with the head portion 36 of the element 20.

If desired, the fit of the shank portion 35 and sealing ring 39 may be made sufficient to retain the shank portion 35 in adjusted axial position relative to tube 21 so that the head portion 36 may selectively be disposed in spaced relationship to the stop shoulder 43 at the lower end of the tube 21. Thus, the device may be utilized with different sized bags while yet providing optimum brewing as permitted by the adjustment of the element 20 on the tube 21.

The foregoing disclosure of specific embodiments is illustrative of the broad inventive concepts comprehended by the invention.

I claim:

1. A liquid flow transfer structure comprising:
   means defining a passage for conducting a brewing liquid and defining a fixed outer end;
   means for supporting a bag containing a beverage ingredient and having an expandable portion adjacent said fixed passage end;
   and a force distribution element having a shank portion removably carried in said passage outer end and a flat head portion defining a substantial bag-engaging outer surface and a stop surface opposite said bag-engaging surface for limiting the movement of said shank portion axially into said passage to dispose said bag-engaging surface to have a preselected disposition relative to said bag supporting means notwithstanding urging of the shank portion outwardly relative to said passage as a result of liquid pressure and flow forces directed outwardly thereagainst.

2. The liquid flow structure of claim 1 wherein said shank portion of said force distributing element includes a concentric seal member sealingly engaging the passage means adjacent said outer end.

3. The liquid flow structure of claim 1 wherein said head portion is defined by a rounded peripheral edge at said outer surface.

4. The liquid flow structure of claim 1 wherein said head portion has a thickness approximately one-half the length of said shank portion.

5. The liquid flow structure of claim 1 wherein said head portion has a diameter of over approximately twice the diameter of said shank portion.

6. The liquid flow structure of claim 1 wherein said shank portion has a length in said passage of at least approximately one-half inch.

7. The liquid flow structure of claim 1 wherein said head portion has a thickness of at least approximately one-quarter inch.

8. A liquid flow transfer structure comprising: means defining a passage for conducting a brewing liquid and defining an outer end; means for supporting a bag containing a beverage ingredient and having an expandable portion adjacent said fixed passage end, said supporting means having a closed bottom wall and a peripheral upstanding side wall; and a force distributing element at said passage end defining a bag-engaging outer flat surface having a substantial area less than the area of said expandable portion of the bag whereby a substantial surface portion of the bag engages the said element surface and a substantial portion of the bag expands around the peripheral edge of said force distributing element in an expanded condition of the bag resulting from flow of brewing liquid into the bag from said passage and upwardly from the bag through said portion expanded around said peripheral edge.

9. The liquid flow structure of claim 8 wherein said force distributing element is formed of a molded plastic.

10. The liquid flow structure of claim 8 wherein said area of the bag engaging surface is less than approximately one-half that of the internal area of the bag supporting means at the plane of said bag-engaging surface.

11. A liquid flow trnasfer structure comprising: means defining a passage for conducting a brewing liquid and defining an outer end; means for supporting a bag containing a beverage ingredient and having an expandable portion adjacent said fixed passage end; and a force distributing element at said passage end defining a bag-engaging outer flat surface having a substantial area less than the area of said expandable portion of the bag whereby a substantial surface portion of the bag engages the said element surface and a substantial portion of the bag expands around the peripheral edge of said force distributing element in an expanded condition of the bag resulting from flow of brewing liquid into the bag from said passage, said passage being circular in cross section and said force distributing element defining an axial bore having a diameter less than approximately one-half the diameter of said passage end.

12. A liquid flow transfer structure comprising: means defining a passage for conducting a brewing liquid and defining an outer end; means for supporting a bag containing a beverage ingredient and having an expandable portion adjacent said fixed passage end; a force distributing element at said passage end defining a bag-engaging outer flat surface having a substantial area less than the area of said expandable portion of the bag whereby a substantial surface portion of the bag engages the said element surface and a substantial portion of the bag expands around the peripheral edge of said force distributing element in an expanded condition of the bag resulting from flow of brewing liquid into the bag from said passage; and means for adjustably positioning said force distributing element relative to said bag-supporting means.

* * * * *

PO-1050.
(5/69)

UNITED STATES PATENT OFFICE
CERTIFICATE OF CORRECTION

Patent No. 3,771,431      Dated November 13, 1973

Inventor(s) MILTON F. EHRENBERG, JR.

It is certified that error appears in the above-identified patent and that said Letters Patent are hereby corrected as shown below:

Claim 11, column 6, line 2, after "defining" cancel "an" and insert --a fixed--.

Claim 12, column 6, line 21, after "defining" cancel "an" and insert --a fixed--.

Signed and sealed this 17th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,771,431  Dated November 13, 1973

Inventor(s) MILTON F. EHRENBERG, JR.

It is certified that error appears in the above-identified patent and that said Letters Patent are hereby corrected as shown below:

Claim 8, column 5, line 12, after "defining" cancel "an" and insert --a fixed--.

Signed and sealed this 18th day of February 1975.

(SEAL)
Attest:

RUTH C. MASON
Attesting Officer

C. MARSHALL DANN
Commissioner of Patents
and Trademarks